United States Patent
Lai

(10) Patent No.: US 11,319,980 B2
(45) Date of Patent: May 3, 2022

(54) WALL NAIL

(71) Applicant: YU JIA INDUSTRY CO., LTD., Taichung (TW)

(72) Inventor: Wen-Ta Lai, Taichung (TW)

(73) Assignee: YU JIA INDUSTRY CO., LTD, Taichung (TW)

( * ) Notice: Subject to any disclaimer, the term of this patent is extended or adjusted under 35 U.S.C. 154(b) by 133 days.

(21) Appl. No.: 16/054,395

(22) Filed: Aug. 3, 2018

(65) Prior Publication Data
US 2020/0011362 A1 Jan. 9, 2020

(30) Foreign Application Priority Data
Jul. 3, 2018 (TW) .................. 107208997

(51) Int. Cl.
| | |
|---|---|
| *F16B 25/00* | (2006.01) |
| *F16B 15/02* | (2006.01) |
| *E04B 1/41* | (2006.01) |
| *F16B 23/00* | (2006.01) |
| *E04B 1/76* | (2006.01) |

(52) U.S. Cl.
CPC ........ *F16B 25/0031* (2013.01); *E04B 1/4178* (2013.01); *F16B 15/02* (2013.01); *F16B 25/0026* (2013.01); *F16B 25/0063* (2013.01); *E04B 1/7629* (2013.01); *E04B 2001/7679* (2013.01); *F16B 23/0061* (2013.01); *F16B 25/00* (2013.01)

(58) Field of Classification Search
CPC .................. F16B 15/0092; F16B 15/02; F16B 25/001–0031; F16B 25/0031; F16B 25/0026; F16B 25/10–103; F16B 35/06; F16B 23/0061; F16B 25/00; F16B 25/0063; E04B 1/4178; E04B 1/7629; E04B 2001/7679
USPC ....................................................... 411/401
See application file for complete search history.

(56) References Cited

U.S. PATENT DOCUMENTS

| | | | | |
|---|---|---|---|---|
| 4,473,984 A | * | 10/1984 | Lopez ....................... | E04B 2/94 411/397 |
| 4,764,069 A | * | 8/1988 | Reinwall ............. | B25B 13/5091 411/397 |
| 7,717,015 B2 | * | 5/2010 | Nilsen ................... | B25B 13/065 411/396 |
| 9,273,461 B1 | * | 3/2016 | Hohmann, Jr. ........ | E04B 1/4178 |
| 9,758,958 B2 | * | 9/2017 | Hohmann, Jr. ........ | E04B 1/4178 |
| 2008/0141605 A1 | * | 6/2008 | Hohmann ............... | F16B 41/00 52/408 |
| 2009/0185880 A1 | * | 7/2009 | Gong .................. | F16B 25/0031 411/387.4 |

(Continued)

FOREIGN PATENT DOCUMENTS

TW M518737 U 3/2016

*Primary Examiner* — Roberta S Delisle
(74) *Attorney, Agent, or Firm* — Muncy, Geissler, Olds & Lowe, P.C.

(57) ABSTRACT

A wall nail includes a rod body, a nail head, a rotary head, and a rubber cover. The rod body has a first end portion and a second end portion opposite to the first end portion. The nail head includes a threaded rod and a drill. Two ends of the threaded rod are integrally connected with the second end portion of the rod body and the drill respectively. The rotary head is integrally formed on the first end portion of the rod body. The rubber cover covers the peripheries of the rod body and the rotary head.

8 Claims, 5 Drawing Sheets

(56) References Cited

U.S. PATENT DOCUMENTS

| | | | | |
|---|---|---|---|---|
| 2012/0291390 A1* | 11/2012 | Hohmann, Jr. | ....... | E04B 1/4178 52/565 |
| 2012/0304576 A1* | 12/2012 | Hohmann, Jr. | ....... | E04B 1/4178 52/513 |
| 2013/0232909 A1* | 9/2013 | Curtis | ....... | E04B 2/30 52/704 |
| 2013/0340378 A1* | 12/2013 | Hohmann, Jr. | ....... | E04B 1/4178 52/705 |
| 2014/0075855 A1* | 3/2014 | Hohmann, Jr. | ....... | E04B 1/4178 52/167.1 |
| 2016/0032582 A1* | 2/2016 | Hohmann, Jr. | ....... | E04B 1/4178 52/703 |
| 2016/0160906 A1* | 6/2016 | Blaess | ....... | F16B 35/06 403/122 |
| 2020/0001350 A1* | 1/2020 | Hohmann, Jr. | ....... | B21K 1/56 |

\* cited by examiner

WALL NAIL

BACKGROUND OF THE INVENTION

1. Field of the Invention

The present invention relates to screw structures and more particularly, to a wall nail for fastening a formwork on a wall.

2. Description of the Related Art

It is a well-known architectural technique that a wall is constructed in a way that a cement wall (concrete wall) or a steel frame is firstly built, then an insulating plate is disposed on the outside of the cement wall or steel frame, then wall nails are inserted through the insulating plate and the cement wall or steel frame to fasten the insulating plate on the cement wall or steel frame, and at last a brick wall is built on the outside of the insulating plate, so that the whole wall structure is accomplished. It can be known from the above description that the wall nail is a necessary component for constructing the wall structure.

Referring to Taiwan Patent No. M518737, FIGS. 4-5 of the patent disclosed a steel structural screw 10, i.e. the so-called wall nail in the present invention. The steel structural screw 10 is provided at the bottom thereof with a threaded hole and an external threaded portion 12 screwed into the threaded hole. Besides, the steel structural screw 10 is provided at the top thereof with a fixed sheet 14. The fixed sheet 14 is combined with a rotary head 20 by resistance welding, so that the whole steel structural screw is accomplished. It can be known from the above description that the conventional steel structural screw is relatively more complicated in structure, and also relatively more complex in manufacturing manner.

Besides, the conventional manner of manufacturing the steel structural screw is manufacturing each partial component by forging and then combining the components to compose the steel structural screw, which not only raises the manufacturing cost, and inefficient economically.

Integrating the above description, the conventional steel structural screw still needs improvement.

SUMMARY OF THE INVENTION

Therefore, it is a primary objective of the present invention to provide a wall nail which is relatively simpler in structure and also simplified in manufacturing process, thereby lowered in manufacturing cost and economically efficient.

The wall nail includes a rod body, a nail head, a rotary head, and a rubber cover. The rod body has a first end portion and a second end portion opposite to the first end portion. The nail head includes a threaded rod and a drill. Two ends of the threaded rod are integrally connected with the second end portion of the rod body and the drill respectively. The rotary head is integrally formed on the first end portion of the rod body. The rubber cover covers the peripheries of the rod body and the rotary head.

Preferably, the rubber cover is made from Ethylene Propylene Diene Monomer (EPDM). Such material has the anti-aging, wear-resisting and waterproof characteristics, thereby protective to the rod body and the rotary head, so that the rod body and the rotary head will not rust or corrode because of long-term usage.

Preferably, a protrusion is annularly provided on the periphery of the junction of the second end portion of the rod body and the threaded rod. When the nail head of the wall nail is inserted through an insulating plate and threaded into a steel frame or cement wall, the protrusion is adapted to seal the hole drilled on the cement wall or steel frame by the nail head.

Preferably, the rubber cover covers the protrusion, and as the above description, the rubber cover can appropriately protect the protrusion, so that the protrusion will not rust or corrode because of long-term usage.

Preferably, in an embodiment of the present invention, the drill is taper-shaped, so that the drill is beneficial to drill the cement wall.

Preferably, in an embodiment of the present invention, the drill is provided with at least one chip discharging groove, so that the drill is beneficial to drill an iron plate or a steel frame, and the chips produced by the drilling can be discharged out through the at least one chip discharging groove.

Preferably, in an embodiment of the present invention, the rotary head includes a dish and a vertical plate; the dish has a bottom surface and a top surface opposite to the bottom surface; the first end portion of the rod body is integrally connected with the bottom surface of the dish; the vertical plate is integrally formed on the top surface of the dish vertically; the external radius of the dish is larger than the external radius of the rod body; the rubber cover covers the dish and the vertical plate. In this way, the user can use an electric or pneumatic tool to drive the rubber cover covering the vertical plate to drive the rod body and the nail head to rotate synchronously and penetrate through the insulating plate and the steel frame or cement wall of the wall structure to fasten the insulating plate on the steel frame or cement wall.

Preferably, a through hole penetrates through the rubber cover and the vertical plate.

Preferably, in an embodiment of the present invention, the rubber cover includes a first covering portion, a second covering portion and a third covering portion, which are formed integrally; the first covering portion covers the rod body; the second covering portion covers the dish; the third covering portion covers the vertical plate; the external radius of the second covering portion is larger than the external radius of the first covering portion.

Preferably, a through hole penetrates through the third covering portion and the vertical plate.

In this way, the user can use an electric or pneumatic tool to drive the third covering portion covering the vertical plate to drive the vertical plate, the rod body and the nail head to rotate synchronously and penetrate through the insulating plate and the steel frame or cement wall of the wall structure to fasten the insulating plate on the steel frame or cement wall. Furthermore, because the external radius of the second covering portion covering the dish is larger than the external radius of the first covering portion covering the rod body, one side of the second covering portion, which faces toward the insulating plate, will be tightly abutted against the insulating plate and seal the hole drilled on the insulating plate by the nail head.

Preferably, in the wall nail provided by the present invention, the rod body, the nail head and the rotary head are formed integrally by pressing, and then the rubber cover covers the rod body and the rotary head, so that the manufacturing process of the wall nail is accomplished, which is not only relatively lower in manufacturing cost but also simplified in manufacturing process, thereby having the advantage of raising the economic efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
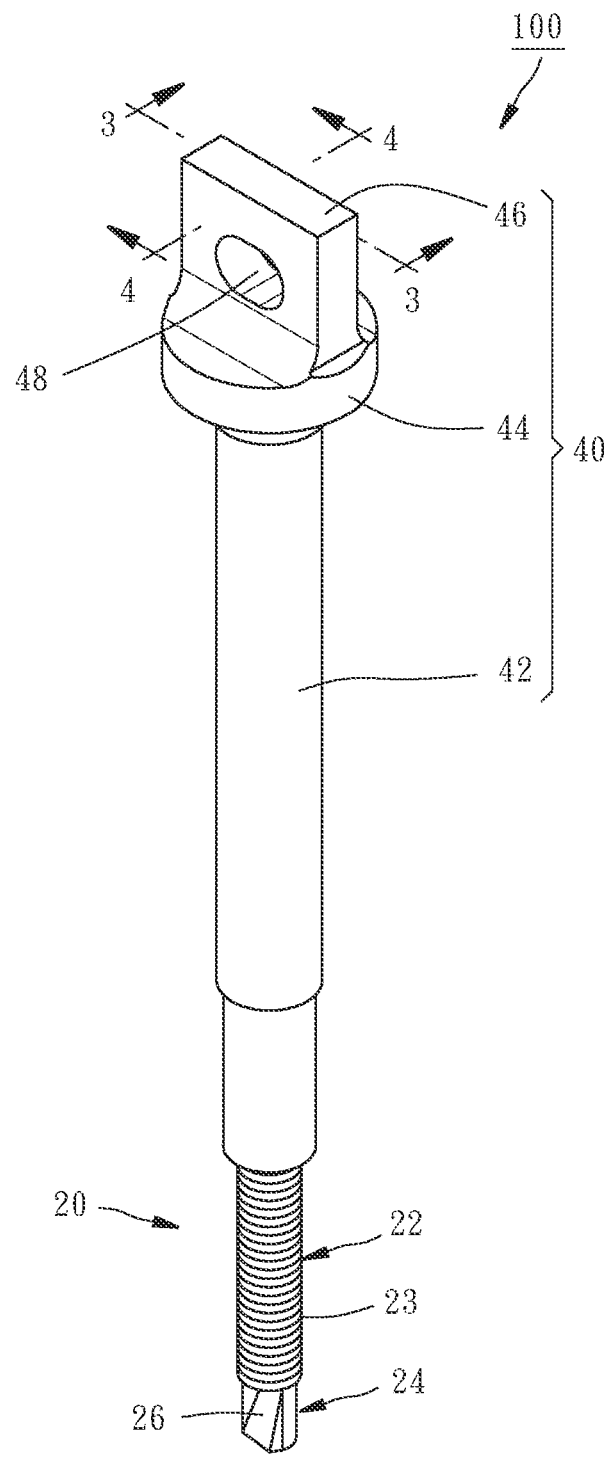
FIG. 1 is a perspective view of a first embodiment of the present invention, showing the type that the drill has a chip discharging groove.
Figure 2:
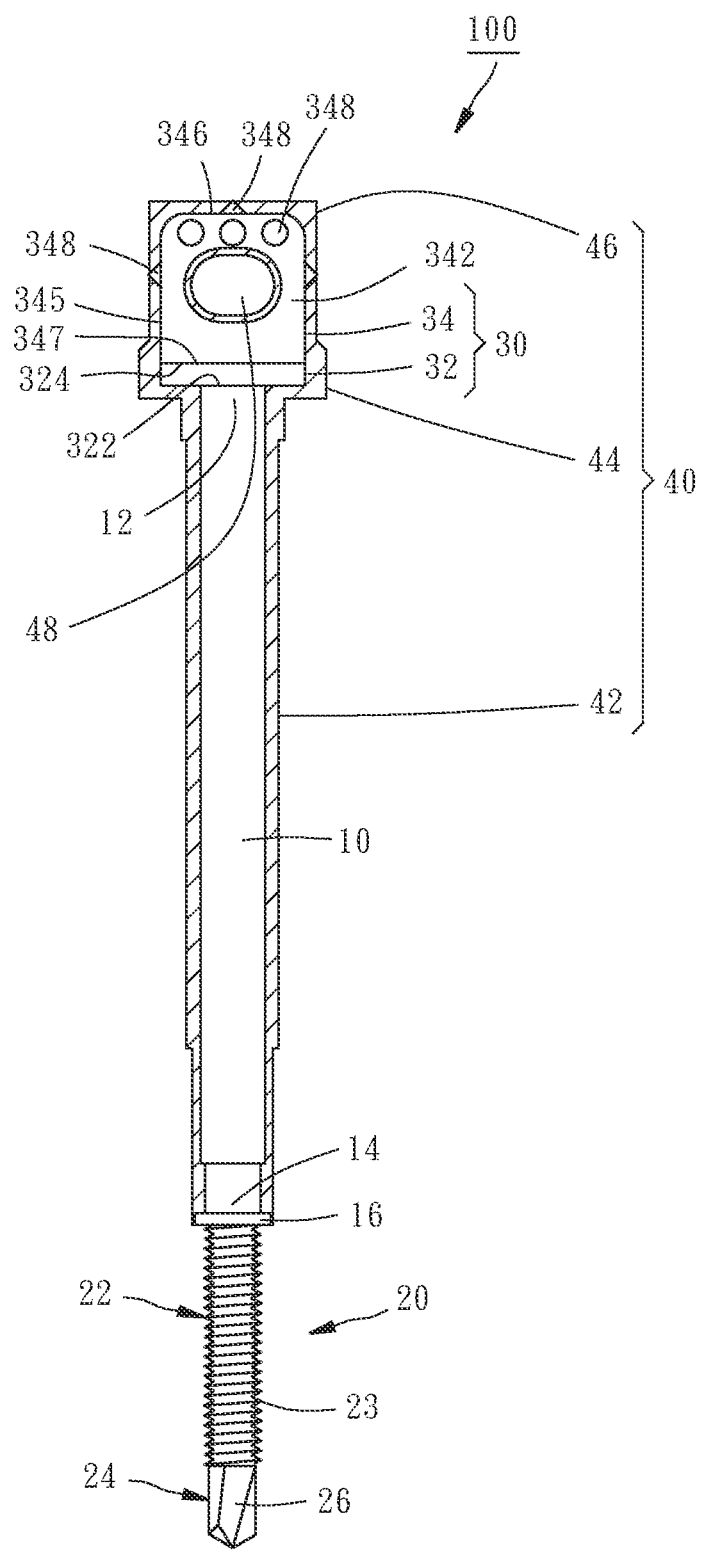
FIG. 2 is a partially sectional view of the first embodiment of the present invention, showing the positional relation between a rubber cover and a rod body, a rotary head and a nail head.
Figure 3:
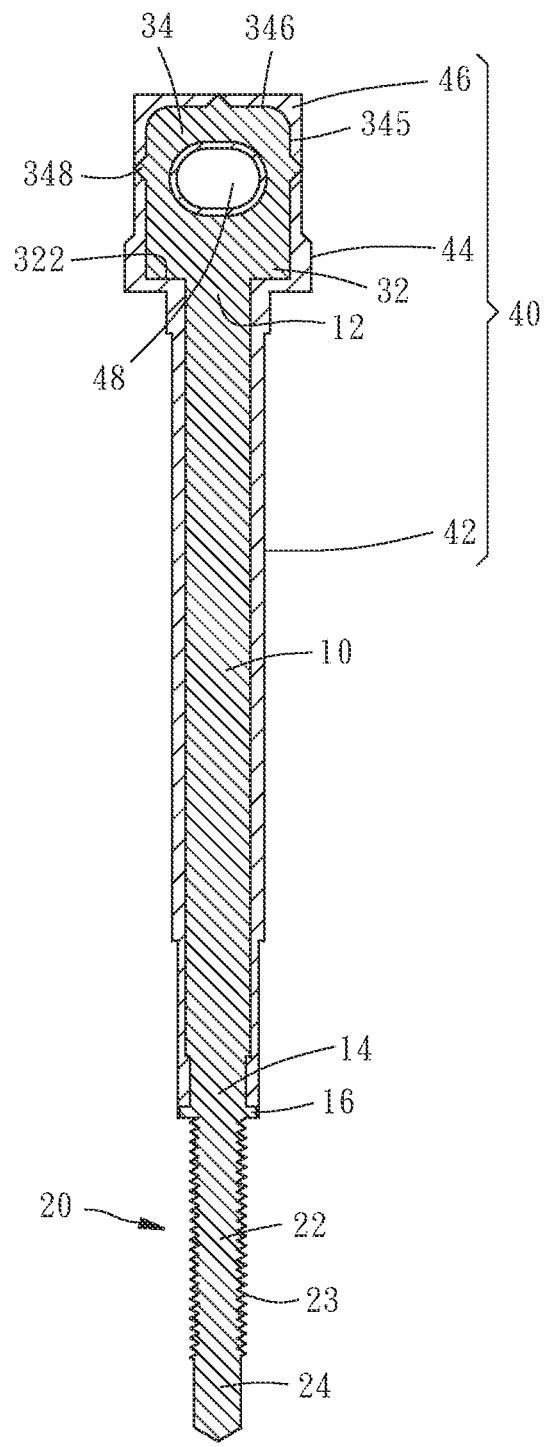
FIGS. 3-4 are sectional views respectively taken along the line 3-3 and the line 4-4 in FIG. 1, showing the type that a through hole penetrates through the rubber cover and a vertical plate.
Figure 4:
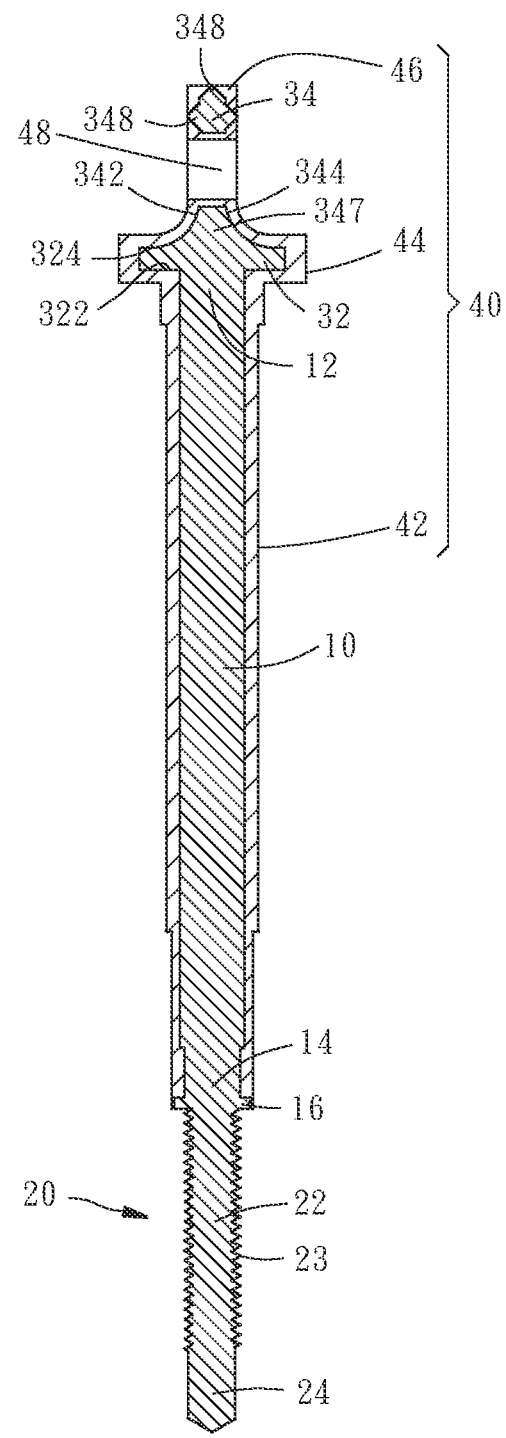

Referring to FIGS. 1-4, the wall nail 100 provided by the first embodiment of the present invention includes a rod body 10, a nail head 20, a rotary head 30, and a rubber cover 40. The rod body 10, the nail head 20 and the rotary head 30 are formed integrally. Specifically speaking, the rod body 10, the nail head 20 and the rotary head 30 are made of metal and formed integrally by pressing, thereby lowering the manufacturing cost.

The rod body 10 in this embodiment is a cylindrical rod for the purpose of lowering the resistance when drilling. In other embodiments, the cross section of the rod body 10 may be polygon-shaped. The rod body 10 has a first end portion 12 and a second end portion 14 opposite to the first end portion 12.

Figure 5:
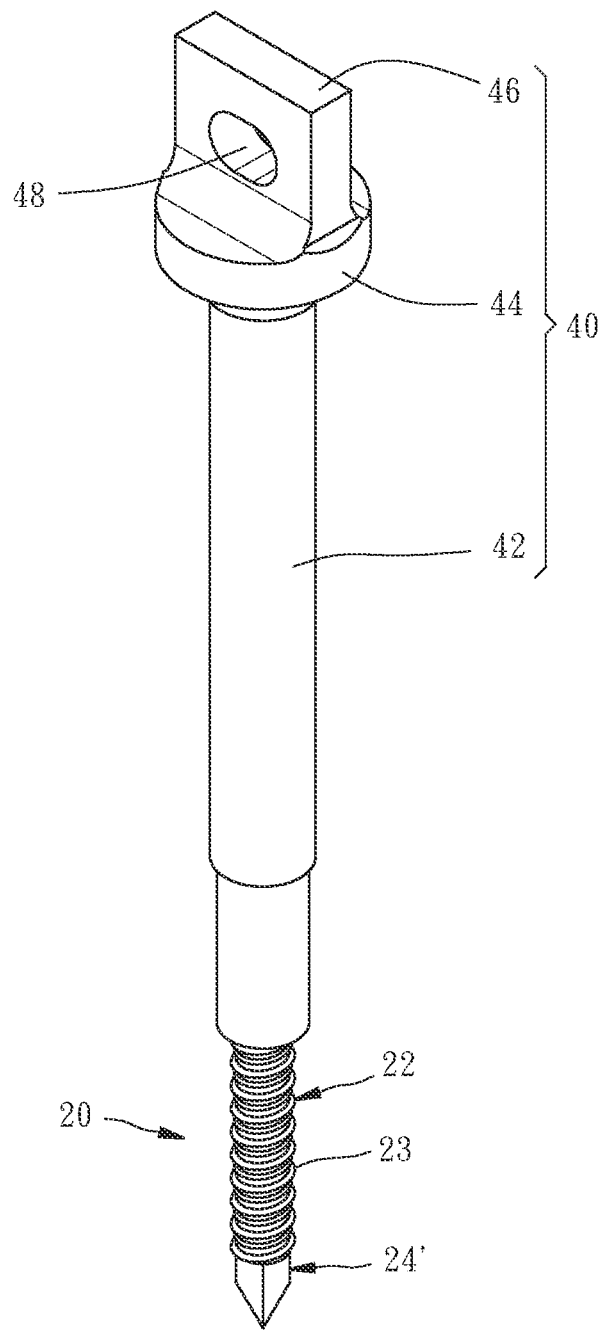
FIG. 5 is a perspective view of a second embodiment of the present invention, showing the type that the drill is taper-shaped.

The nail head 20 includes a threaded rod 22 and a drill 24. The threaded rod 22 is shaped as an elongated shaft and provided on the periphery thereof with an external thread 23, so that when the wall nail 100 is threaded into the wall 60, the threaded rod 22 is screwed together with the hole 62 on the wall 60. Two ends of the threaded rod 22 are integrally connected with the second end portion 14 of the rod body 10 and the drill 24 respectively. The threaded rod 22, the rod body 10 and the drill 24 are provided coaxially and rotatable synchronously. Besides, a protrusion 16 is annularly provided on the periphery of the junction of the second end portion 14 of the rod body 10 and the threaded rod 22, and the external radius of the protrusion 16 is larger than the external radius of the threaded rod 22 and the drill 24. In this way, when the nail head 20 of the wall nail 100 is threaded into the wall 60, the protrusion 16 is adapted to seal the hole 62 drilled on the wall 60 by the nail head 20. In this embodiment, the drill 24 is applied to the wall 60 composed of steel frames or iron plates, so the drill 24 is provided with at least one chip discharging groove 26. In this way, when the drill 24 drills the wall 60 composed of the steel frames or iron plates, the chips produced by the drilling are discharged out through the chip discharging groove 26. Referring to FIG. 5, which illustrates the second embodiment of the present invention, if the drill 24' is applied to the cement or concrete wall, the drill 24' is configured to be taper-shaped, thereby beneficial to drill the cement or concrete wall.

The rotary head 30 is integrally formed on the first end portion 12 of the rod body 10, so the rotary head 30 is rotatable synchronously with the rod body 10 and the nail head 20. The rotary head 30 can be driven by an electric tool or pneumatic tool to rotate, thereby synchronously driving the rod body 10 and the nail head 20 to rotate and drill the wall 60. Specifically speaking, the rotary head 30 includes a dish 32 and a vertical plate 34. The dish 32 in this embodiment is a circular dish. In other embodiments, the dish may be a polygonal dish or irregular-shaped dish. The dish 32 has a bottom surface 322 and a top surface 324 opposite to the bottom surface 322. The first end portion 12 of the rod body 10 is integrally connected with the bottom surface 322 of the dish 32. In this embodiment, the first end portion 12 is connected to the center of the bottom surface 322 of the dish 32, and the bottom surface 322 of the dish 32 is perpendicular to the rod body 10. The external radius of the dish 32 is larger than the external radius of the rod body 10. The vertical plate 34 is integrally formed on the top surface 324 of the dish 32 vertically and perpendicular to the top surface 324 of the dish 32. The vertical plate 34 has a front end surface 342, a rear end surface 344, and two side portions 345, a top portion 346 and a bottom portion 347, which connect the front end surface 342 and the rear end surface 344. The bottom portion 347 of the vertical plate 34 is integrally connected with the top surface 324 of the dish 32. In this embodiment, each of the two side portions 345, the top portion 346, the front end surface 342 and the rear end surface 344 is provided with at least one protrusion 348. In other embodiments, there may be only at least one of the two side portions 345, the top portion 346, the front end surface 342 and the rear end surface 344 provided with the protrusion 348. The protrusion 348 is provided for the effect that when the rubber cover 40 to be mentioned in the following description covers the vertical plate 34, the protrusion 348 can reinforce the connective strength between the rubber cover 40 and the vertical plate 34.

The rubber cover 40 covers the peripheries of the rod body 10 and the rotary head 30. In this embodiment, the rubber cover 40 is made from Ethylene Propylene Diene Monomer (EPDM). The Ethylene Propylene Diene Monomer (EPDM) has the anti-aging, wear-resisting and waterproof characteristics, thereby protective to the rod body 10 and the rotary head 30, so that the rod body 10 and the rotary head 30 will not rust or corrode because of long-term usage. In other embodiments, the rubber cover 40 may be made from other anti-aging, wear-resisting, waterproof or low-thermal-conductive materials. The rubber cover 40 covers the dish 32 and the vertical plate 34 of the rotary head 30 and covers the rod body 10 and the protrusion 16 annularly provided on the periphery of the junction of the second end portion 14 and the threaded rod 22. Specifically speaking, the rubber cover 40 includes a first covering portion 42, a second covering portion 44 and a third covering portion 46, which are formed integrally. The first covering portion 42 covers the rod body 10 and the protrusion 16 annularly provided on the periphery of the junction of the second end portion 14 and the threaded rod 22. The second covering portion 44 covers the dish 32. The third covering portion 46 covers the vertical plate 34. The external radius of the second covering portion 44 is larger than the external radius of the first covering portion 42.

A through hole 48 penetrates through the rubber cover 40 and the vertical plate 34. Specifically speaking, the through hole 48 penetrates through the third covering portion 46 of the rubber cover 40 and the front end surface 342 and the rear end surface 344 of the vertical plate 34.

Figure 6:
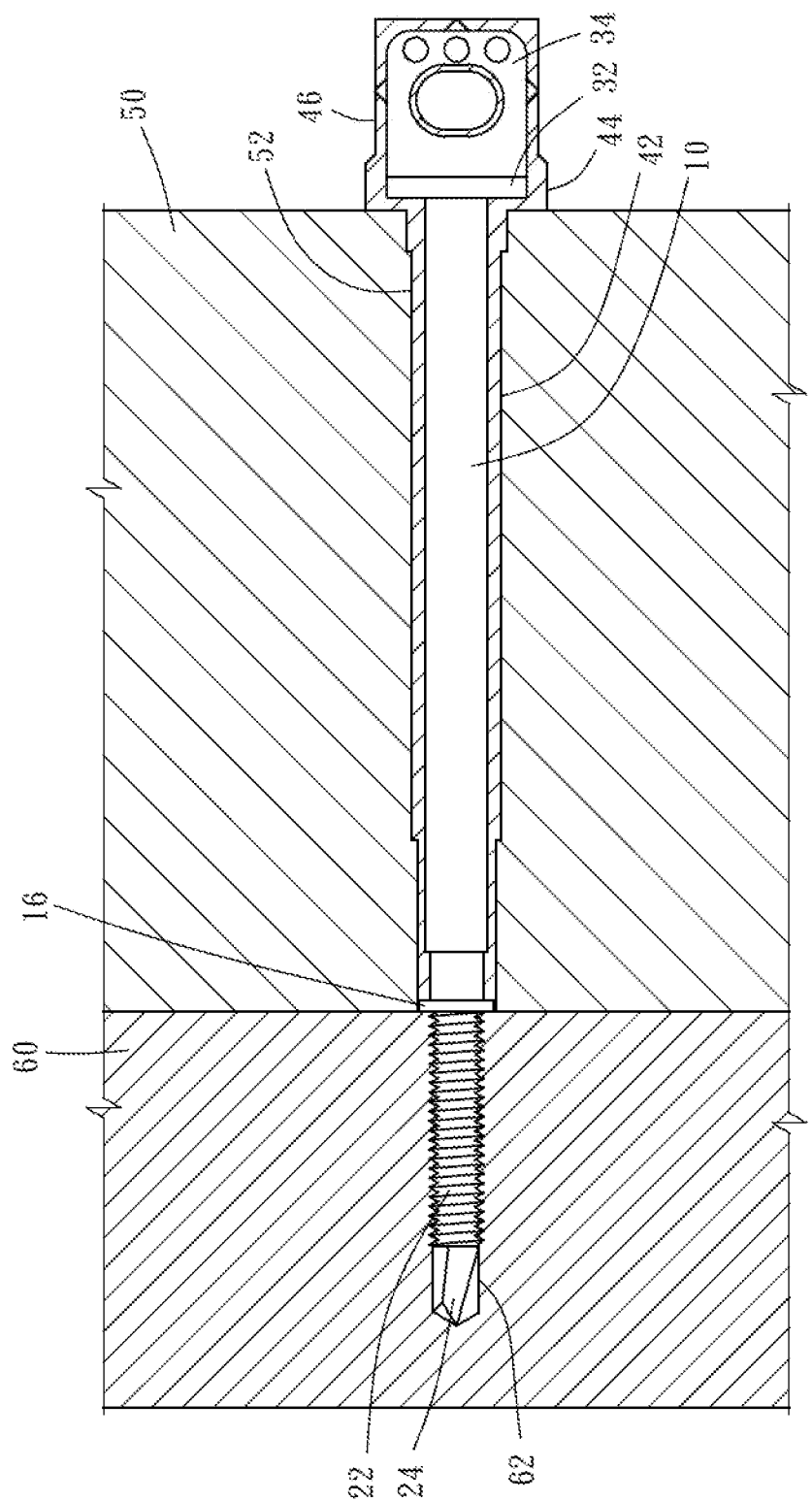
FIG. 6 is a schematic sectional view showing a usage status of the first embodiment of the present invention that the wall nail fastens a plate on a wall.

Referring to FIG. 6, the status that the wall nail 100 provided by the first embodiment of the present invention fastens a plate 50 on the wall 60 composed of the steel frames or iron plates is illustrated. In this embodiment, the plate 50 is an insulating plate. In other embodiments, the plate 50 may be a general architectural formwork, a waterproof plate, or a heat-insulating plate. The third covering portion 46 covering the vertical plate 34 can be driven by an electric or pneumatic tool (not shown) to rotate, thereby synchronously driving the second covering portion 44, the first covering portion 42, the vertical plate 34, the dish 32, the rod body 10, the threaded rod 22 and the drill 24 to rotate. At the same time, the user uses the electric or pneumatic tool to apply a force to the wall nail 100 to cause the drill 24 and the threaded rod 22 of the wall nail 100 inserted through the plate 50 and screwed into the wall 60. At this time, the protrusion 16 annularly provided on the periphery of the junction of the second end portion 14 and the threaded rod 22 and coordinating with the first covering portion 42 can seal the hole 62 drilled on the wall 60 by the drill 24. Because the external radius of the second covering portion 44 is larger than the external radius of the first covering portion 42, the second covering portion 44 can seal the through hole 52 drilled on the plate 50 by the drill 24 and the threaded rod 22, and one side of the second covering portion 44, which faces toward the plate 50, is tightly abutted against the plate 50, thereby fastening the plate 50 on the wall 60.

Integrating the above description, in the wall nail 100 provided by the present invention, the rod body 10, the nail head 20 and the rotary head 30 are formed integrally by pressing, and then the rubber cover 40 covers the rod body 10 and the rotary head 30, so that the manufacturing of the wall nail 100 is accomplished, which is not only low in manufacturing cost but also simplified in manufacturing process, thereby having the advantage of raising the economic efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wall nail comprising:
   a rod body having a first end portion and a second end portion opposite to the first end portion;
   a nail head comprising a threaded rod and a drill, two ends of the threaded rod being monolithically connected with the second end portion of the rod body and the drill respectively;
   a rotary head integrally formed on the first end portion of the rod body; and
   a rubber cover covering peripheries of the rod body and the rotary head;
   wherein a protrusion is annularly provided on a periphery of a junction of the second end portion of the rod body and the threaded rod, and the rubber cover covers the protrusion;
   wherein a recess is annularly provided on a periphery of a junction of the second end portion of the rod body and the protrusion, and the rubber cover covers the recess; and
   wherein the rubber cover is provided at an outer periphery thereof with at least one step portion located between the first and second end portions of the rod body.

2. The wall nail as claimed in claim 1, wherein the rubber cover is made from Ethylene Propylene Diene Monomer (EPDM).

3. The wall nail as claimed in claim 1, wherein the drill is taper-shaped.

4. The wall nail as claimed in claim 1, wherein the drill is provided with at least one chip discharging groove.

5. The wall nail as claimed in claim 1, wherein the rotary head comprises a dish and a vertical plate; the dish has a bottom surface and a top surface opposite to the bottom surface; the first end portion of the rod body is integrally connected with the bottom surface of the dish; the vertical plate is integrally formed on the top surface of the dish vertically; an external radius of the dish is larger than an external radius of the rod body; the rubber cover covers the dish and the vertical plate.

6. The wall nail as claimed in claim 5, wherein a through hole penetrates through the rubber cover and the vertical plate.

7. The wall nail as claimed in claim 5, wherein the rubber cover comprises a first covering portion, a second covering portion and a third covering portion, which are formed integrally; the first covering portion covers the rod body; the second covering portion covers the dish; the third covering portion covers the vertical plate; an external radius of the second covering portion is larger than an external radius of the first covering portion.

8. The wall nail as claimed in claim 7, wherein a through hole penetrates through the third covering portion and the vertical plate.

* * * * *